United States Patent [19]

Choi

[11] Patent Number: 5,587,982
[45] Date of Patent: Dec. 24, 1996

[54] OPTICAL DISK DRIVE DEVICE CAPABLE OF DETECTING MISPLACEMENT OF OPTICAL DISKS

[75] Inventor: Tae-Young Choi, Uiwang, Rep. of Korea

[73] Assignee: SamSung Electronics Co., Ltd., Suwon, Rep. of Korea

[21] Appl. No.: 547,070

[22] Filed: Oct. 23, 1995

[30] Foreign Application Priority Data

May 12, 1995 [KR] Rep. of Korea ............... 11766/1995

[51] Int. Cl.$^6$ .............................. G11B 3/90; G11B 23/00
[52] U.S. Cl. ........................ 369/58; 369/258; 369/233
[58] Field of Search ............................ 369/58, 32, 13, 369/258, 233, 260, 261, 262, 263, 54, 56; 360/97.02, 99.06, 99.02, 99.07

[56] References Cited

U.S. PATENT DOCUMENTS

| | | | |
|---|---|---|---|
| 4,453,245 | 5/1984 | Sugiyama et al. | 369/230 |
| 4,710,908 | 12/1987 | Ohshima et al. | 369/32 |
| 4,733,314 | 3/1988 | Ogawa et al. | 369/261 |
| 4,800,551 | 1/1989 | Norris | 369/77.1 |
| 4,805,164 | 2/1989 | Yamaguchi et al. | 369/258 |
| 5,130,521 | 7/1992 | Shino et al. | 369/258 |
| 5,224,079 | 6/1993 | Inoue | 369/13 |

FOREIGN PATENT DOCUMENTS

| | | |
|---|---|---|
| 1199362 | 8/1989 | Japan . |
| 64972 | 1/1994 | Japan . |
| 652617 | 2/1994 | Japan . |

*Primary Examiner*—Tan Dinh
*Attorney, Agent, or Firm*—Robert E. Bushnell, Esq.

[57] ABSTRACT

An optical disk driving apparatus having a function for preventing misplacement of an optical disk within the optical disk driving apparatus, includes: a main body having an opening through which the optical disk moves in and out of the apparatus; a transfer portion for moving the optical disk into and out from the main body; a driving portion for rotatably driving the optical disk inserted into the main body; an optical pickup for detecting information recorded on the optical disk loaded on the driving portion; at least one light emitting portion for irradiating light upon a surface of the optical disk; at least one light receiving portion for receiving light irradiated by the light emitting portion(s) and reflected by the optical disk to detect the inserted state of the optical disk; and a circuit portion for transmitting information detected by the light receiving portion(s) to the transfer portion so that the optical disk is ejected from the apparatus before being loaded onto the driving portion when the optical disk is misplaced.

15 Claims, 5 Drawing Sheets

OPTICAL DISK DRIVE DEVICE CAPABLE OF DETECTING MISPLACEMENT OF OPTICAL DISKS

CROSS-REFERENCE TO RELATED APPLICATIONS

This application makes reference to, incorporates the same herein, and claims all benefits accruing under 35 U.S.C. §119 from an application for *Optical Disk Driving Apparatus Adopting A Function Of Preventing Misplacement Of Optical Disks And Driving Method Thereof* earlier filed in the Korean Industrial Property Office on 12 May 1995 and there assigned Ser. No. 11766/1995.

BACKGROUND OF THE INVENTION

The present invention relates to an optical disk driving apparatus and method for preventing misplacement of an optical disk within the apparatus, and more particularly, to an optical disk driving apparatus for preventing misplacement of an optical disk within the apparatus during loading and a method for ejecting the optical disk from the apparatus before loading when the optical disk is determined to be misplaced.

Compact disk players (CDP), CD-ROM drives, and optical laser disk players (LDP) are widely known as types of optical disk driving apparatuses. The optical disk driving apparatus typically reproduces information recorded on an optical disk. The optical disk driving apparatus is often classified according to the size of disk it accommodates. When the optical disk is inserted into the optical disk driving apparatus, it is essential that the optical disk be properly positioned so that the information can be accurately read from the disk. Even if the optical is not properly positioned during insertion, the optical disk is still often loaded onto a driving means, such as a spindle motor, which is rotatably driven regardless of the inserted state of the optical disk. After the driving means rotates the optical disk, the misplacement of the optical disk is usually recognized and the optical disk can then be unloaded from the optical disk driving apparatus. Accordingly, a considerable amount of time can be wasted due to the misplacement of the optical disk.

One prior art reference that seeks to detect the position of an optical disk within an optical disk driving apparatus is disclosed in U.S. Pat. No. 4,805,164 entitled *Disc Inclination Detecting Apparatus* issued to Yamaguchi et al. on 14 Feb. 1989. In Yamaguchi et al. '164, a light-emitting element projects a beam of light upon the surface of a disk after the disk is loaded upon a rotational axis driven by a motor. And light-sensitive element receives the beam of light reflected by the surface of the disk and generates a corresponding electrical signal. Based on the electrical signal the angle of inclination of the disk can be detected. While conventional art, such as Yamaguchi et al. '164, possesses merit in its own right, I note that the position of the disk is not detected until the disk is loaded upon its rotational axis. Accordingly, such conventional art suffers from the aforementioned inconvenience of requiring the user to wait unnecessarily for the disk's position to be detected.

SUMMARY OF THE INVENTION

Accordingly, it is the object of the present invention to provide an improved optical disk driving apparatus and method.

It is another object to provide an optical disk driving apparatus and method for preventing misplacement of an optical disk within the apparatus.

It is still another object to provide an optical disk driving apparatus and method that automatically ejects an optical disk from the apparatus before loading when it is determined that the optical disk is misplaced.

It is yet another object to provide an optical disk driving apparatus and method that reduces the delay time incurred by the user when an optical disk has been misplaced within the apparatus.

It is still yet another object to provide an optical disk driving apparatus and method where a user can recognize a misplaced disk when multiple optical disks are selectively loaded into the apparatus.

These and other objects can be achieved by the present invention with an optical disk driving apparatus having the function of preventing the misplacement of an optical disk. The optical disk driving apparatus includes: a main body having an opening through which the optical disk is transferred into and out of the apparatus; a transfer portion for transferring the optical disk into and out of the main body; a driving portion for rotatably driving the optical disk inserted into the main body; an optical pickup for detecting information recorded on the optical disk loaded on the driving portion; at least one light emitting portion for irradiating light upon the surface of the optical disk; at least one light receiving portion for receiving the light irradiated by the light emitting portion(s) and reflected by the optical disk in order to detect whether the optical disk is properly inserted; and a circuit portion for transmitting information detected in the light receiving portion(s) to the transfer portion so that the optical disk is ejected from the apparatus before being loaded onto the driving portion when the optical disk is misplaced. A driving method for use in the optical disk driving apparatus includes the steps of: determining whether or not the optical disk is inserted; irradiating light upon the surface(s) of the optical disk when the optical disk is inserted; receiving light reflected from the surface(s) of the optical disk; determining whether the optical disk is properly inserted based on the amount of reflected light that is received; performing a normal loading operation of the optical disk when it is determined that the optical disk has been properly inserted; and performing an ejection operation on the optical disk when it is determined that the optical disk has been improperly inserted.

BRIEF DESCRIPTION OF THE DRAWINGS

A more complete appreciation of the invention, and many of the attendant advantages thereof, will be readily apparent as the same becomes better understood by referring to the following detailed description when considered in conjunction with the accompanying drawings in which like reference symbols indicate the same or similar components, wherein.

DETAILED DESCRIPTION OF THE INVENTION

Figure 1:
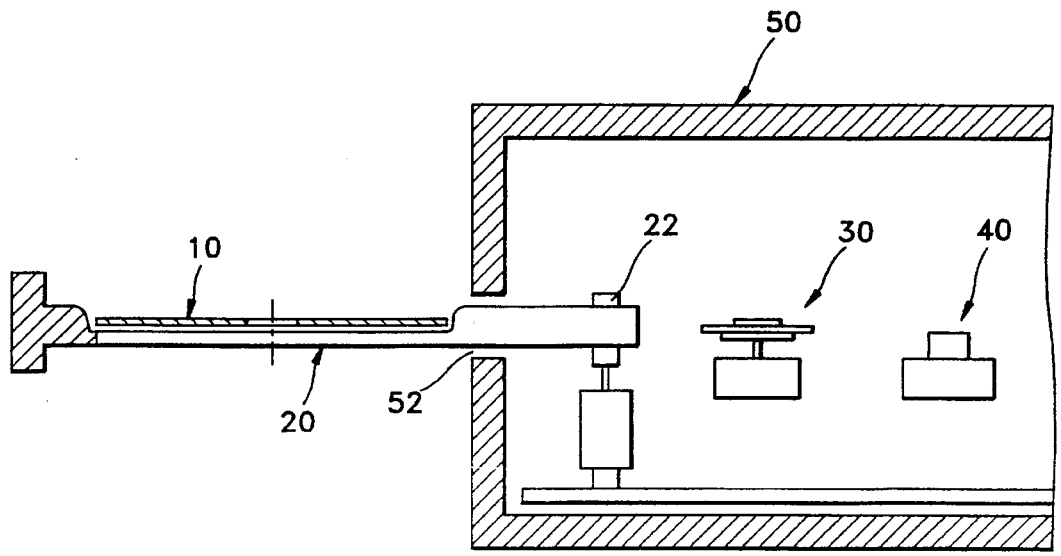
FIG. 1 is a cross-sectional view showing a conventional optical disk driving apparatus.

Turning now to the drawings and referring to FIG. 1, a cross-sectional view of a conventional optical disk driving apparatus is shown. The optical disk driving apparatus of FIG. 1 includes: an optical disk 10, a main body 50 having an opening 52 on at least one side thereof, a transfer portion 20 for transferring optical disk 10 in and out of main body 50, a driving portion 30, such as a spindle motor, for rotatably driving optical disk 10 after loading, and an optical pickup 40 for reproducing information recorded on optical disk 10 or recording new information on optical disk 10. Driving portion 30 and optical pickup 40 are installed within main body 50. Transfer portion 20 moves in and out of main body 50 through opening 52 via a transfer motor 22.

In the conventional optical disk driving apparatus in FIG. 1, when a user improperly inserts optical disk 10 into the optical driving apparatus (e.g., optical disk 10 is inserted upside down), optical disk 10 is loaded onto driving portion 30 which is rotatably driven regardless of the inserted state of optical disk 10. After driving portion 30 rotates optical disk 10, the misplacement of optical disk 10 is recognized and optical disk 10 is then unloaded from main body 50 of the apparatus. Accordingly, a considerable amount of time can be wasted due to the misplacement of optical disk 10.

While such a disadvantage may not create a large problem when optical disk 10 is manually fed into the apparatus one disk at a time, the magnitude of the problem increases greatly when an optical disk 10 is misplaced within a caddy containing multiple optical disks 10 which are simultaneously fed into the apparatus. In these instances, the apparatus often determines that the misplaced optical disk 10 is not within the caddy. Thus, a search error can result when the CD-ROM is used to search for errors, thereby making an accurate search impossible.

Figure 2:
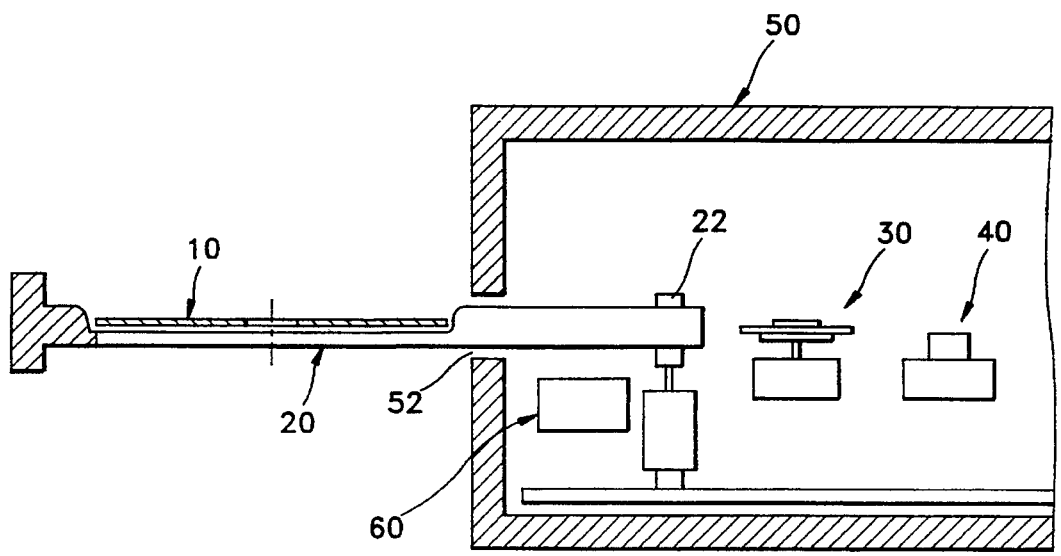
FIG. 2 is a cross-sectional view showing an optical disk driving apparatus having a function for preventing misplacement of the optical disk within the apparatus according to the principles of the present invention.
Figure 3A:
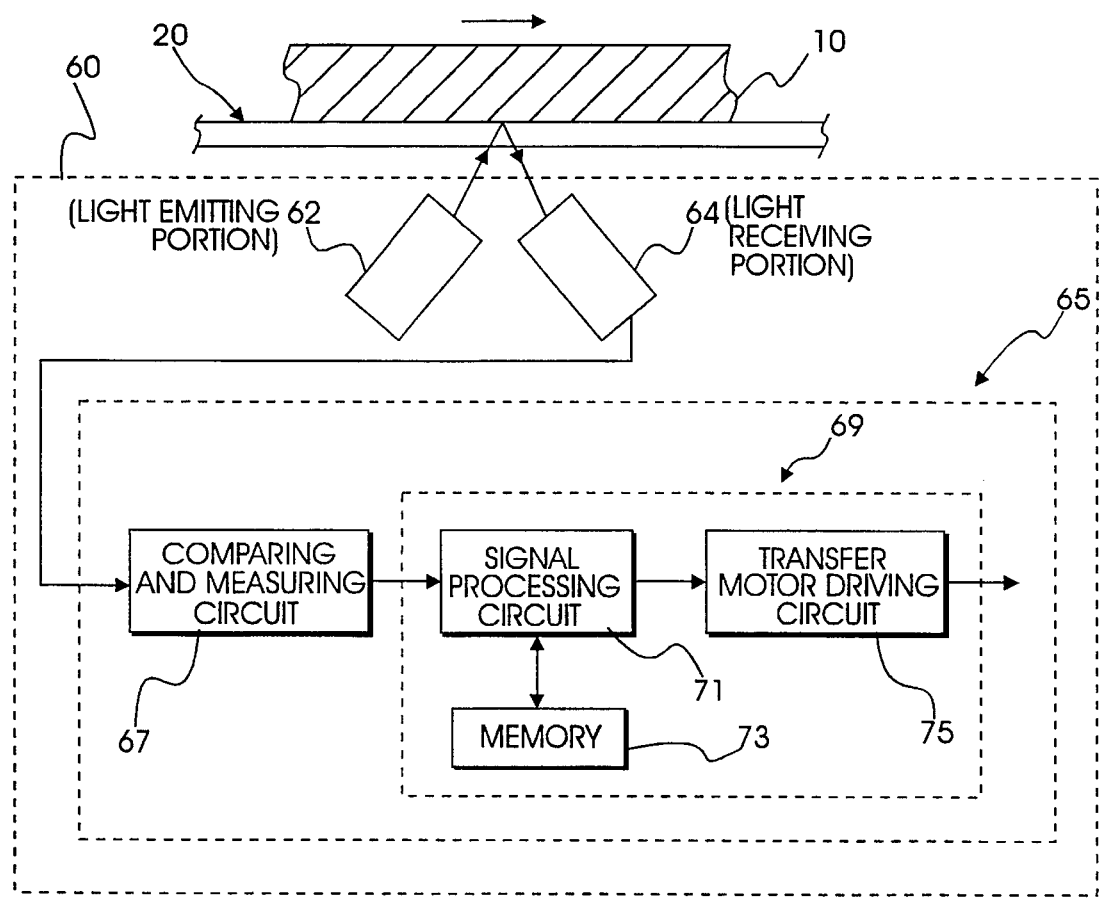
FIGS. 3A through 3C are block diagrams showing different embodiments of the means for preventing misplacement of the optical disk within the optical disk driving apparatus according to the principles of the present invention.
Figure 3B:
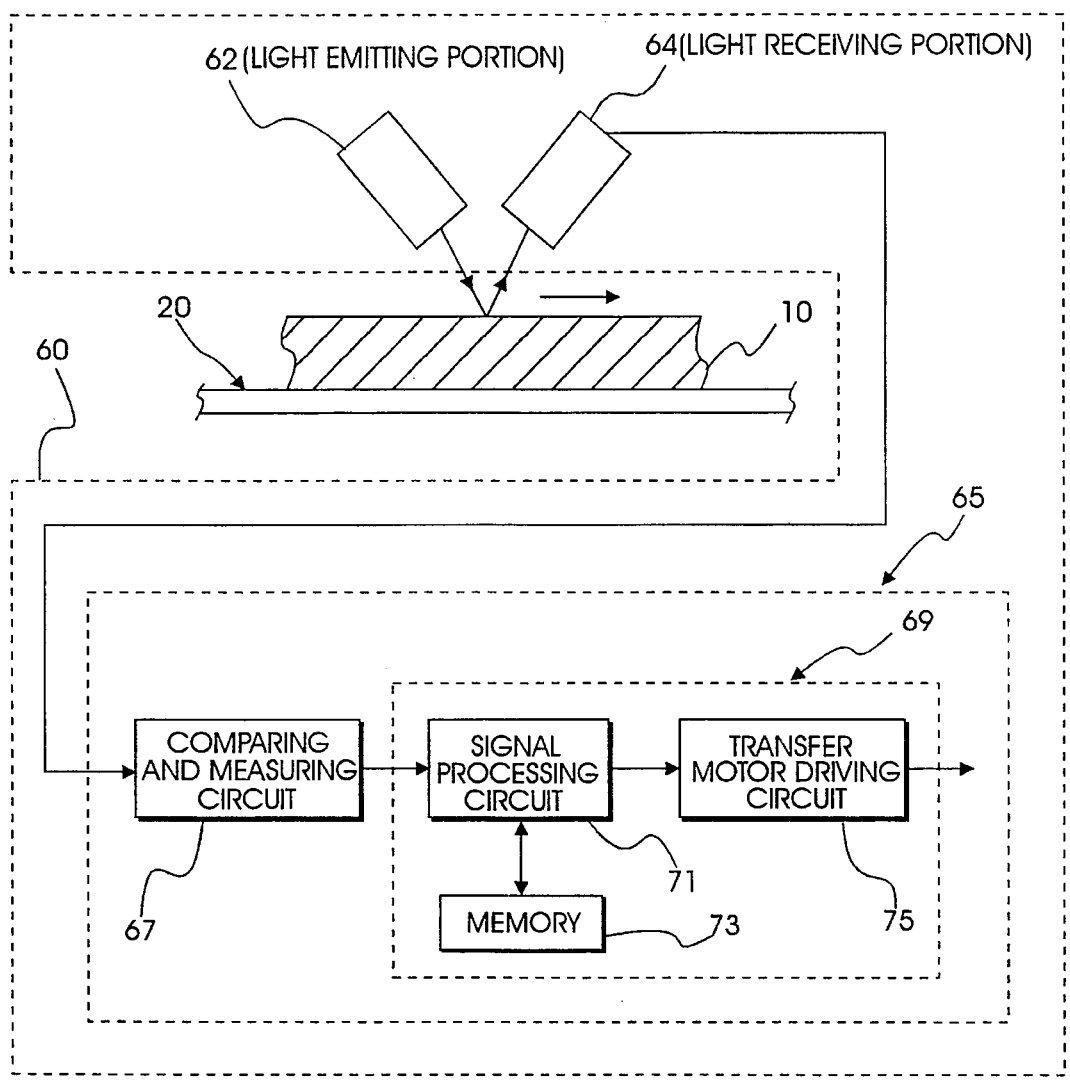
Figure 3C:
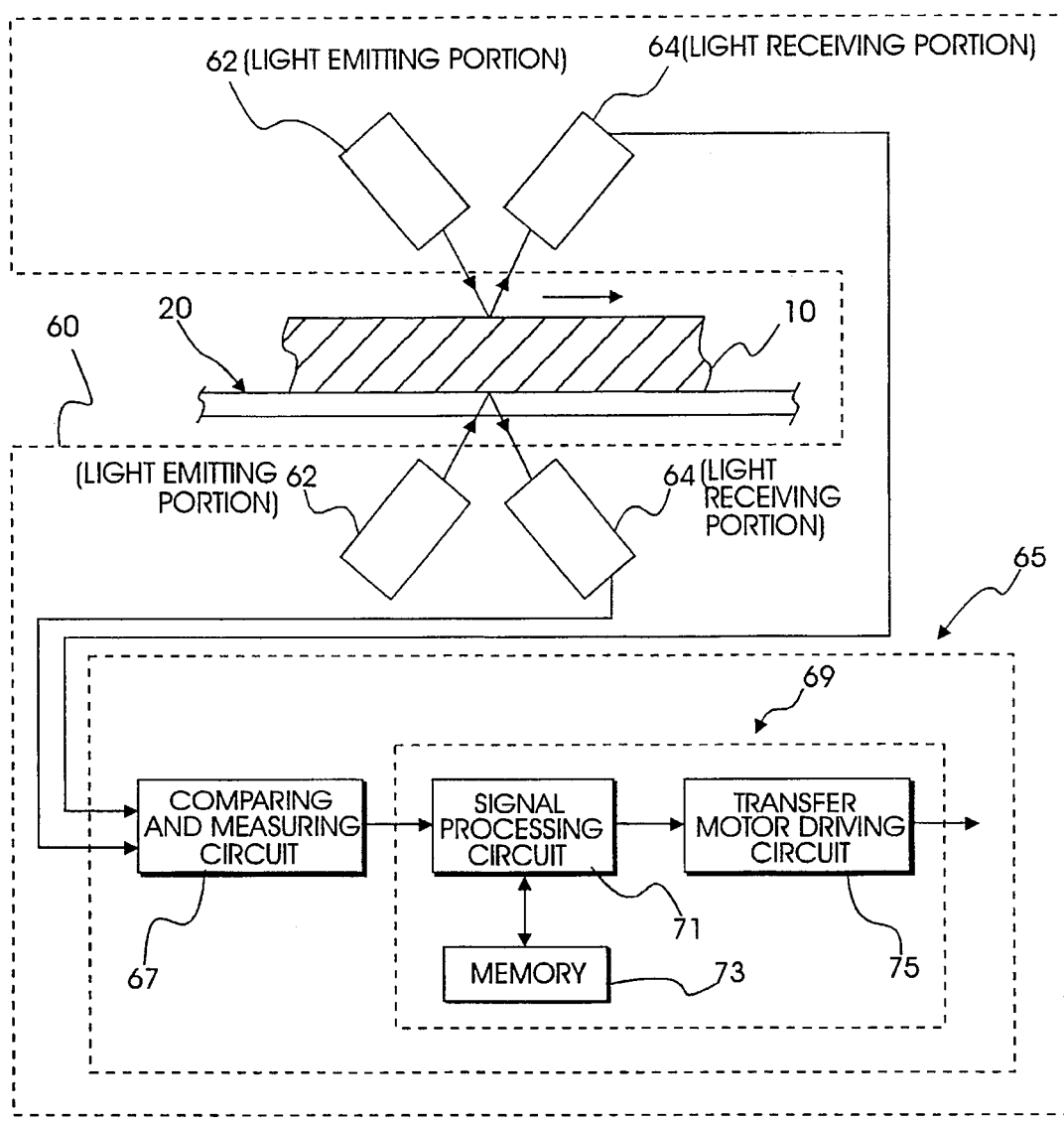
Figure 4:
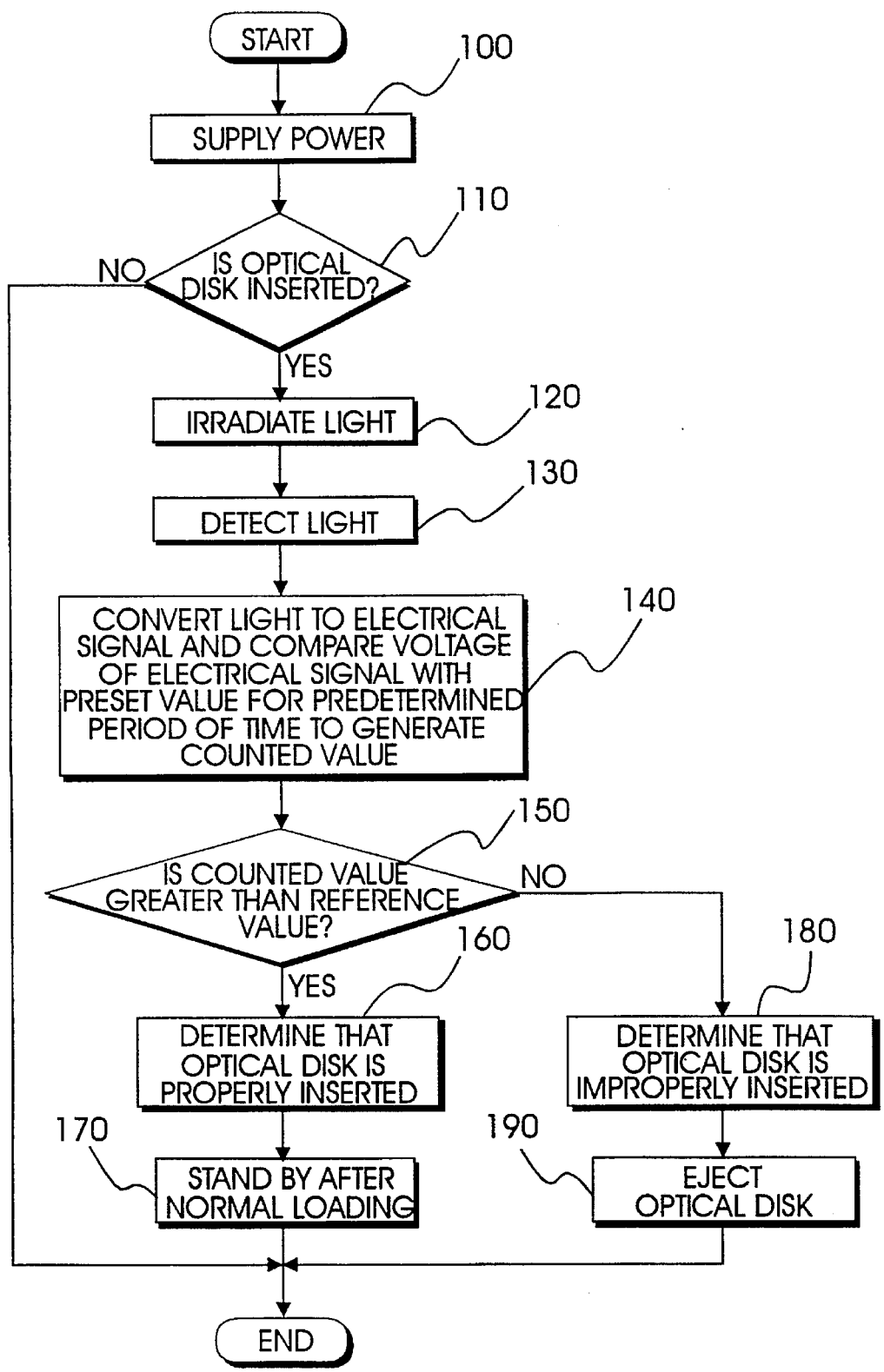
FIG. 4 is a flow chart of the method for use in an optical disk driving apparatus having the function of preventing misplacement of the optical disk within the apparatus according to the principles of the present invention.

Referring to FIGS. 2 through 4, embodiments of the optical disk driving apparatus constructed according to the principles of the present invention will now be explained. Components in FIG. 2 having the same reference numbers as those shown in FIG. 1 have the same or equivalent function.

As shown in FIG. 2, an optical disk driving apparatus includes: optical disk 10, main body 50 having opening 52 on at least one side thereof, transfer portion 20 for transferring optical disk 10 in and out of main body 50, driving portion 30, such as a spindle motor, for rotatably driving optical disk 10 after loading, and optical pickup 40 for reproducing information recorded on optical disk 10 or recording new information on optical disk 10. Driving portion 30 and optical pickup 40 are installed within main body 50. Transfer portion 20 moves in and out of main body 50 through opening 52 via transfer motor 22.

The optical disk driving apparatus of FIG. 2 further includes an optical disk misplacement prevention unit 60 for determining whether optical disk 10 is properly inserted before being loaded onto driving portion 30, and thereby eject the optical disk from main body 50 when it is determined that optical disk 10 is misplaced. Misplacement prevention unit 60 determines the inserted state of optical disk 10 before optical disk 10 is loaded onto driving portion 30.

Referring now to FIGS. 3A through 3C, different embodiments of the means for preventing misplacement of an optical disk within the optical disk driving apparatus of the present invention are shown. In FIGS. 3A through 3C, misplacement prevention unit 60 includes at least one light emitting portion 62, at least one light receiving portion 64 and a circuit portion 65. Each light emitting portion 62 is an optical device, such as a light emitting diode (LED) or a semiconductor laser, that irradiates light onto one side of the inserted optical disk 10. Each light emitting portion 62 is coupled to main body 50 and is tilted with respect to optical disk 10 so that the path of light reflected from optical disk 10 is different from the path of incident light. Light emitting portion 62 and light receiving portion 64 can be positioned adjacent to either surface (i.e., recording or non-recording) of optical disk 10, as shown in FIGS. 3A and 3B, or can be positioned adjacent to both surfaces of optical disk 10, as shown in FIG. 3C.

Light receiving portion 64 is installed at a predetermined location with respect to light emitting portion 62 to receive light irradiated from light emitting portion 62 and reflected from optical disk 10. Accordingly, it is possible to determine the inserted state of optical disk 10 based on the distribution of the received light.

Namely, since the reflectiveness of the recording surface of optical disk 10, and the non-recording surface opposite the recording surface, are different from each other, the reflecting path of light emitted from light emitting portion 62 and incident to the recording surface of optical disk 10 is different from the light incident to the reverse (non-recording) surface of optical disk 10. The amount of light received by light receiving portion 64 is compared with a reference value corresponding to the applicable surface of optical disk 10. Accordingly, it is possible to determine whether the reflecting surface is the recording surface or the reverse (non-recording) surface. From the amount of light received by receiving portion 64, a reference for determining whether the irradiated surface is the recording surface or the reverse (non-recording) surface can be selected according to the disposed locations of light emitting portion 62 and light receiving portion 64, respectively. In the embodiment shown in FIG. 3C, multiple light emitting portions 62 and light receiving portions 64 are provided so that light is irradiated onto and received from both surfaces of optical disk 10. The amount of light received by each light receiving portion 64 when the optical disk 10 is properly inserted should be the equal to a preset reference quantity of light for the applicable surface.

As shown in FIGS. 3A through 3C, misplacement prevention unit 60 includes at least one light emitting portion 62, at least one light receiving portion 64, and circuit portion 65. Circuit portion 65 includes a comparing and measuring circuit 67 and a control circuit 69 for processing the amount of light received by light receiving portion 64. Circuit portion 65 determines whether optical disk 10 inserted via transfer portion 20 will be loaded or ejected according to the amount of light received by light receiving portion 64, thereby determining a direction of travel for transfer portion 20.

Comparing and measuring circuit 67 converts the light received by light receiving portion 64 into an electrical signal. The converted electrical signal exhibits a voltage that varies according to the amount of light received by light receiving portion 64. The voltage exhibited by the converted electrical signal is compared with a preset value to thereby determine whether the voltage exhibited by converted electrical signal is greater than or less than the preset value. When the voltage of the converted electrical signal is greater than the preset value, the converted electrical signal is represented as a logic "1". When the voltage of the converted electrical signal is less than the preset value, the converted electrical signal is represented as a logic "0". Also, the number of occurrences of logic "1" or logic "0" are counted. Then, it is determined whether the counted value is greater than or less than a reference value, which is the reference for determining whether optical disk 10 is properly inserted.

Control circuit 69 includes a memory 73 for storing data to enable execution of a reset function and an algorithm required for signal processing, a signal processing circuit 71 for determining the inserted state of optical disk 10 from the signals output from comparing and measuring circuit 67, and a transfer motor driving circuit 75 for driving transfer motor 22 in order to move transfer portion 20.

An embodiment of a driving method of the optical disk driving apparatus of the present invention will now be described as follows.

Power is supplied to the optical disk driving apparatus, in step 100. Then, in step 110, it is determined whether optical disk 10 is being inserted. If optical disk 10 is not being inserted, misplacement prevention unit 60 is not driven. When optical disk 10 is being inserted, light is irradiated upon at least one surface of optical disk 10 by light emitting portion(s) 62, in step 120, and light reflected from the surface of optical disk 10 is detected by light receiving portion(s) 64, in step 130. In step 140, the received light is converted into an electrical signal having a voltage that varies in dependence upon the amount of light detected by light receiving portion(s) 64. The magnitude of this voltage is compared with the preset value. It is determined whether the voltage exhibited by the converted electrical signals is greater than or less than the preset value. When the voltage of the converted electrical signal is greater than the preset value, the converted electrical signal is represented as a logic "1". When the voltage of the converted electrical signal is less than the preset value, the converted electrical signal is represented as a logic "0". Also, the number of occurrences of one of the logic states is counted for a predetermined period of time. In step 150, it is determined whether the counted value is greater than a reference value, which is the reference value for determining whether the optical disk 10 is properly inserted. If the counted value evaluated in step 150 is greater than the reference value, it is determined that optical disk 10 is properly inserted, in step 160. After optical disk 10 is determined to be properly loaded, a standby state is established, in step 170. If the counted value evaluated in step 150 is less than the reference value, it is determined that optical disk 10 is improperly loaded (i.e., misplaced), in step 180. Accordingly, optical disk 10 is ejected, in step 190.

According to the driving method described above, a misplaced optical disk is extracted at the time of searching material recorded on the optical disk 10. Accordingly, a user can easily and quickly recognize the misplaced optical disk.

Accordingly, the insertion state of the optical disk 10 can be determined before the optical disk 10 is loaded onto driving portion 30. When the optical disk 10 is misplaced, the optical disk 10 is promptly ejected to therefore reduce the amount of time required by the user to correct the misplacement. Also, in the case where multiple optical disks are selectively loaded, the user can quickly recognize the misplaced optical disk.

While there have been illustrated and described what are considered to be the preferred embodiments of the present invention, it will be understood by those skilled in the art, that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiments disclosed as the best mode contemplated for carrying out the present invention, but that the present invention includes all embodiments falling within the scope of the appended claims.

What is claimed is:

1. An optical disk driving apparatus for preventing misplacement of an optical disk within said optical disk driving apparatus, said optical disk driving apparatus comprising:

a main body having an opening through which said optical disk is transferred into and out from said optical disk driving apparatus;

transfer means for transferring said optical disk into and out from said main body;

driving means, positioned within said main body, for rotatably driving said optical disk when said optical disk is loaded upon said driving means;

an optical pickup for detecting information recorded on said optical disk while said optical disk is rotated by said driving means;

light emitting means for irradiating first light onto at least one surface of said optical disk while said optical disk is being inserted into said main body via said transfer means;

light receiving means, positioned apart from said light emitting means, for receiving second light reflected by said optical disk in response to said first light irradiated by said light emitting means; and circuit means for determining whether said optical disk is being properly inserted into said main body in dependence upon an amount of said second light received by said light receiving means, said circuit means controlling said transfer means to eject said optical disk from said main body before said optical disk is loaded upon said driving means when said optical disk is not being properly inserted into said main body.

2. The optical disk driving apparatus of claim 1, wherein said circuit means comprises:

a comparing and measuring circuit for generating logic signals in one of a first logic state and a second logic state different from said first logic state in dependence upon said amount of said second light received by said light receiving means; and a control circuit for determining a direction of travel of said transfer means in response to said logic signals generated by said comparing and measuring circuit.

3. The optical disk driving apparatus of claim 2, wherein said comparing and measuring circuit converts said second light received by said light receiving means into an electrical signal exhibiting a first voltage, said first voltage being compared with a preset value to determine whether said first voltage is greater than or less than said preset value, said electrical signal being represented by said first logic state when said first voltage is greater than said preset value, said electrical signal being represented by said second logic state when said first voltage is less than said preset value, said comparing and measuring circuit generating a counted value by counting a number of representations of one of said first logic state and said second logic state for a predetermined period of time.

4. The optical disk driving apparatus of claim 3, wherein said control circuit comprises:

a memory for storing data to enable execution of a signal processing algorithm;

a signal processing circuit for determining whether said optical disk is being properly inserted into said main body in dependence upon said counted value generated by said comparing and measuring circuit; and a transfer motor driving circuit for enabling displacement of said transfer means based on whether said optical disk is being properly inserted into said main body.

5. The optical disk driving apparatus of claim 1, wherein said light emitting means is disposed to irradiate said first light upon a recording surface of said optical disk when said optical disk is being properly inserted into said main body, and said light receiving means is disposed along a path to receive said second light reflected by said optical disk.

6. The optical disk driving apparatus of claim 1, wherein said light emitting means is disposed to irradiate said first light upon a non-recording surface of said optical disk when said optical disk is being properly inserted into said main body, and said light receiving means is disposed along a path to receive said second light reflected by said optical disk.

7. The optical disk driving apparatus of claim 1, wherein said light emitting means comprises first and second light emitting portions that irradiate said first light upon first and second opposing surfaces of said optical disk, respectively, and said light receiving means comprises first and second lighting receiving portions for receiving said second light respectively reflected by said first and second opposing surfaces of said optical disk in response to said first light irradiated by said first and second light emitting portions, respectively.

8. A method for use in an optical disk driving apparatus having a function of preventing misplacement of an optical disk within said optical disk driving apparatus, wherein said optical disk driving apparatus comprises: a main body having an opening through which said optical disk is inserted into and out from said optical disk apparatus, transfer means for transferring said optical disk into and out from said main body, driving means for rotatably driving said optical disk, an optical pickup for detecting information recorded on said optical disk, and means for preventing misplacement of said optical disk within said optical disk driving apparatus, said method comprising the steps of:

determining whether said optical disk is being inserted into said main body via said transfer means;

irradiating first light upon at least one surface of said optical disk when said optical disk is being inserted into said main body;

receiving second light reflected by said optical disk in response to irradiation of said first light;

generating a counted value in dependence upon an amount of said second light received;

comparing said counted value with a reference value to determine whether said optical disk is being properly inserted into said main body;

loading said optical disk upon said driving means when said optical disk is being properly inserted into said main body; and ejecting said optical disk from said main body before said optical disk is loaded upon said driving means when said optical disk is not being properly inserted into said main body.

9. The method of claim 8, wherein said step of generating said counted value further comprises the steps of:

converting said second light into an electrical signal exhibiting a first voltage representative of the amount of said second light received;

comparing said first voltage with a preset value to determine whether said first voltage is greater than or less than said preset value;

representing said electrical signal as a first logic state when said first voltage is greater than said preset value;

representing said electrical signal as a second logic state when said first voltage is less than said present value; and generating said counted value by counting a number of representations of one of said first logic state and said second logic state for a predetermined period of time.

10. An optical disk driving apparatus, comprising:

a main body having an opening through which an optical disk is transferred into and out from said optical disk driving apparatus;

transfer means for moving in a first direction to move said optical disk into said main body, and for moving in a second direction opposite said first direction to move said optical disk out from said main body;

driving means, positioned within said main body, for rotatably driving said optical disk when said optical disk is loaded upon said driving means;

an optical pickup for detecting information recorded on said optical disk while said optical disk is rotated by said driving means;

light emitting means for irradiating first light onto at least one surface of said optical disk while said optical disk is being inserted into said main body via said transfer means;

light receiving means for receiving second light reflected by said optical disk in response to said first light irradiated by said light emitting means;

comparing means for generating logic signals in one of a first logic state and a second logic state different from said first logic state in dependence upon an amount of said second light received by said light receiving means; and control means for determining a direction of travel of said transfer means in dependence upon said logic signals generated by said comparing means, said control means enabling said transfer means to move in said first direction to load said optical disk upon said driving means when said logic signals indicate that said optical disk is being properly inserted into said main body, and enabling said transfer means to move in said second direction to eject said optical disk from said main body before said optical disk is loaded upon said driving means when said logic signals indicate that said optical disk is not being properly inserted into said main body.

11. The optical disk driving apparatus of claim 10, wherein said comparing means converts said second light received by said light receiving means into an electrical signal exhibiting a first voltage, said first voltage being compared with a preset value to determine whether said first voltage is greater than or less than said preset value, said comparing means generating said logic signals in said first logic state when said first voltage is greater than said preset value and generating said logic signals in said second logic state when said first voltage is less than said preset value.

12. The optical disk driving apparatus of claim 11, further comprised of said comparing means for generating a counted value by counting a number of representations of one of said first logic state and said second logic state for a predetermined period of time.

13. The optical disk driving apparatus of claim 12, wherein said control means determines said direction of travel of said transfer means by comparing said counted value with a reference value, said control means enabling said transfer means to move in said first direction when said counted value is greater than said reference value, and enabling said transfer means to move in said second direction when said counted value is less than said reference value.

14. The optical disk driving appparatus of claim 10, wherein said optical disk is being properly inserted into said main body when a surface of said optical disk containing said information has a first orientation that enables said optical pickup to detect said information.

15. The optical disk driving apparatus of claim 14, wherein said optical disk is not being properly inserted into said main body when said surface of said optical disk containing said information has a second orientation that prohibits said optical pickup from detecting said information.

* * * * *